Oct. 11, 1960

W. E. TAYLOR ET AL 2,955,582

TIMED FUEL INJECTION SYSTEM

Filed June 21, 1957

INVENTORS
Walter E. Taylor Jr.
George A. Zink
BY
R. P. Barnard
ATTORNEY

INVENTORS
Walter E. Taylor, E.
George A. Zink
BY
R. F. Barnard
ATTORNEY

United States Patent Office 2,955,582
Patented Oct. 11, 1960

2,955,582

TIMED FUEL INJECTION SYSTEM

Walter E. Taylor, Seymour, and George A. Zink, Bedford, Ind., assignors to General Motors Corporation, Detroit, Mich., a corporation of Delaware Filed June 21, 1957, Ser. No. 667,196

9 Claims. (Cl. 123—119)

The present invention relates to a charge forming device for an internal combustion engine and more particularly a device in which a timed fuel charge is periodically injected into the cylinder air induction passage for mixture with a throttle controlled quantity of air when the cylinder intake valve is open.

In any charge forming device for an internal combustion engine the main problem is insuring that an adequate quantity of fuel is delivered promptly to each cylinder when the intake valve is opened, and at the same time not supplying fuel in excess of that required for combustion. It is the common advantage of all injection type fuel systems that the quantity of fuel necessary for combustion is injected into the cylinder directly or into the intake passage adjacent the cylinder and in this way avoiding the necessity for providing excess quantities of fuel to wet the interior wall surfaces of the intake manifold as is necessary with conventionally carbureted engines. The basic advantages of so injecting fuel are fuel economy and better response to operator demand.

Consistent with these advantages, the present device relates to a simplified timed injection system which is uniquely and conveniently located and capable of inexpensive manufacture.

It is an object of the present invention to provide a fuel injection system in which the components are substantially all located in the engine cylinder head cover. In the present invention means is provided for pumping a timed or measured quantity of fuel in synchronism with the actuation of the cylinder inlet valve. In order to simplify such timed injection as well as to insure synchronization with said inlet valve, the present invention further uniquely provides a common means for opening the inlet valve and pumping the timed fuel charge to the fuel nozzle.

The details of the present invention as well as other objects and advantages thereof will be apparent from a perusal of the description which follows.

Figure 1:
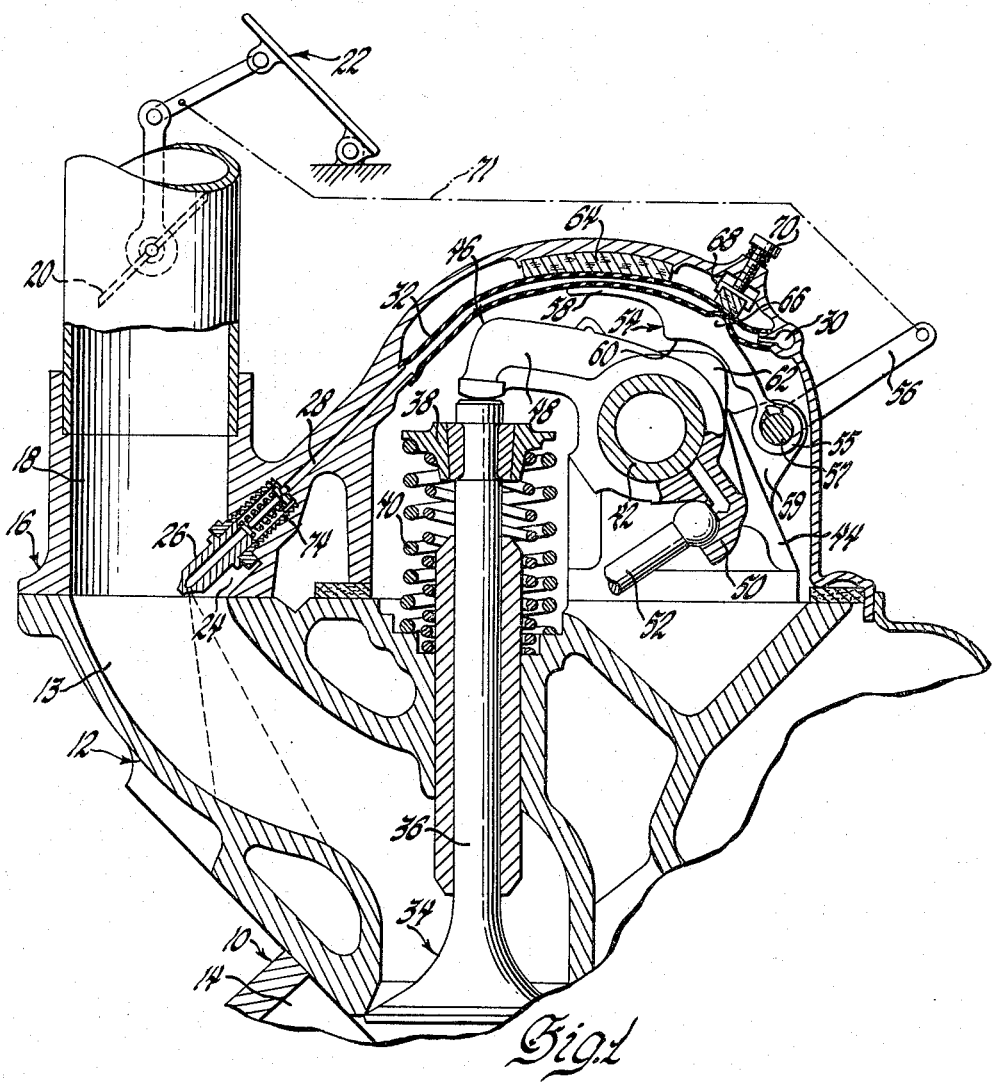
Figure 1 represents a partially sectioned view of an internal combustion engine embodying one modification of the present invention.

It is to be understood that the timed injection systems as shown in the drawings are merely illustrative and it is not intended to limit the scope of the invention to the precise structures shown. Referring to Figure 1 an engine cylinder block is shown at 10 and a cylinder head at 12. An intake passage 13 is formed in the head for each cylinder 14. A cylinder head cover is shown at 16 and includes a common air induction passage 18 in communication with passages 13. A throttle valve 20 is rotatably disposed in the cover intake passage 18 and is controlled by an accelerator pedal indicated generally at 22.

A recess 24 is formed in the cover intake passage 18 and is adapted to removably receive a fuel nozzle 26. The nozzle recess 24 communicates with a passage 28 formed in cover 16. An additional passage 30 is formed in cover 16 and is adapted to communicate with any well known source of low pressure fuel, not shown. Cover fuel passages 28 and 30 are adapted to be communicated by a flexible tube or conduit 32 which, as will be seen later, forms a part of the fuel pumping mechanism.

A cylinder inlet valve 34 is slidably mounted in cylinder head 12 and includes a stem 36 which in the normal manner projects through the cylinder head into the cylinder cover 16. A spring seat 38 is provided in the usual manner on the valve stem to provide a seat for spring means 40 which normally bias the inlet valve in a closed position as shown. A shaft 42 is mounted in supporting journal 44 upon the cylinder head 12 and rotatably supports a rocker arm 46 for each inlet valve 34. The bifurcated rocker arm 46 includes a first arm 48 adapted to engage the upper end of the inlet valve stem 36 and a second arm 50 adapted to be engaged by a push rod 52. The push rod is adapted to coact with a cam shaft, not shown, to periodically oscillate the rocker arm 46 about shaft 42 to open the inlet valve 34.

A lever 54 is pivotally supported at one end 55 to a lever 56. Lever 54 is of a generally arcuate construction and is disposed between the rocker arm 46 and the flexible fuel conduit 32. The lever 54 includes an end portion 58 longitudinally engaging the flexible tube 32 and the extent of which longitudinal engagement is variable by means to subsequently be discussed. The inner surface of the lever 54 has a cam surface 60 adapted to be engaged by a cam portion 62 formed on the rocker arm 46. The lever surface 60 and the cam 62 are so related that the periodic oscillation of rocker arm 46 imparts a similar rocking motion to the lever 54. The rocking of lever 54 causes end portion 58 to periodically squeeze and thereby decrease the tube volume pumping a metered quantity of fuel to the nozzle 26. In order to support the flexible tube 32 within the cover 16 for proper coaction with the lever 54, a pad 64 is mounted within the cover and supports that portion of tube 32 adapted to be engaged by lever portion 58.

An enlargement or hump 66 is formed on the outer surface of lever 54 intermediate its pumping end 58 and its pivotal support. The hump 66 is disposed opposite a stop block 68 mounted upon a cover 16 through an adjusting screw 70. The flexible tube 32 is disposed between the lever hump 66 and the stop block 68 such that during the pumping action of the lever 54 the hump will squeeze the tube against the stop block preventing a reverse flow of fuel in the direction of fuel supply passage 30. It is apparent that as the lever 54 moves away from the flexible tube 32 that hump 66 will permit the flexible tube to open allowing fuel to flow from supply passage 30 until such time as the rocker arm cam again is rotated to a pumping position at which time the hump will again shut off the tube 32. By adjusting the screw 70 the quantity of fuel which may be admitted to the tube 32 during the fuel intake movement of lever 54 may be varied. Pad 64 and the tube engaging portion of block 68 should be formed of any suitably resilient material such as rubber to prevent damage to the tube through wear.

To permit the quantity of fuel pumped by lever 54 and rocker arm 46 to be varied in accordance with operator demand, end 55 of lever 54 is pivotally supported upon a cam surface 57 formed or otherwise provided on lever 56. Lever 56 is pivotally supported at one end on a journal bracket 59 and articulated at the other end to the accelerator pedal 22 through a link 71. Rotation of lever 56 will cause cam 57 to shift the position of the end 55 of lever 54 toward or away from rocker arm cam portion 62. In this manner the pumping stroke of lever 54 is made to vary with accelerator position. As lever end 55 moves toward cam 62 with increased throttle opening the pump stroke is increased increasing the charge supplied to the engine cylinder. Similarly, movement of lever end 55 away from cam 62 will decrease the timed fuel charge.

It is apparent that suitable adjusting means may be provided in the control linkage, if desired, in order to vary the basic relationships between the levers 54 and 56 as well as with the throttle connecting link 71 for proper adjustment of the system.

In order that the fuel in cover passage 28 and flexible tube 32 does not dribble through the nozzle 26 into passage 13, a spring biased check valve 74 is provided within the nozzle opening 24. Valve 74 prevents the flow of fuel to the nozzle 26 during the intake or passage charging stroke of the lever 54.

The flexible tube 32 may be formed of any natural or synthetic material which has good wear characteristics and further which is impervious to the deleterious effects of the fuel flowing therethrough.

Figure 2:
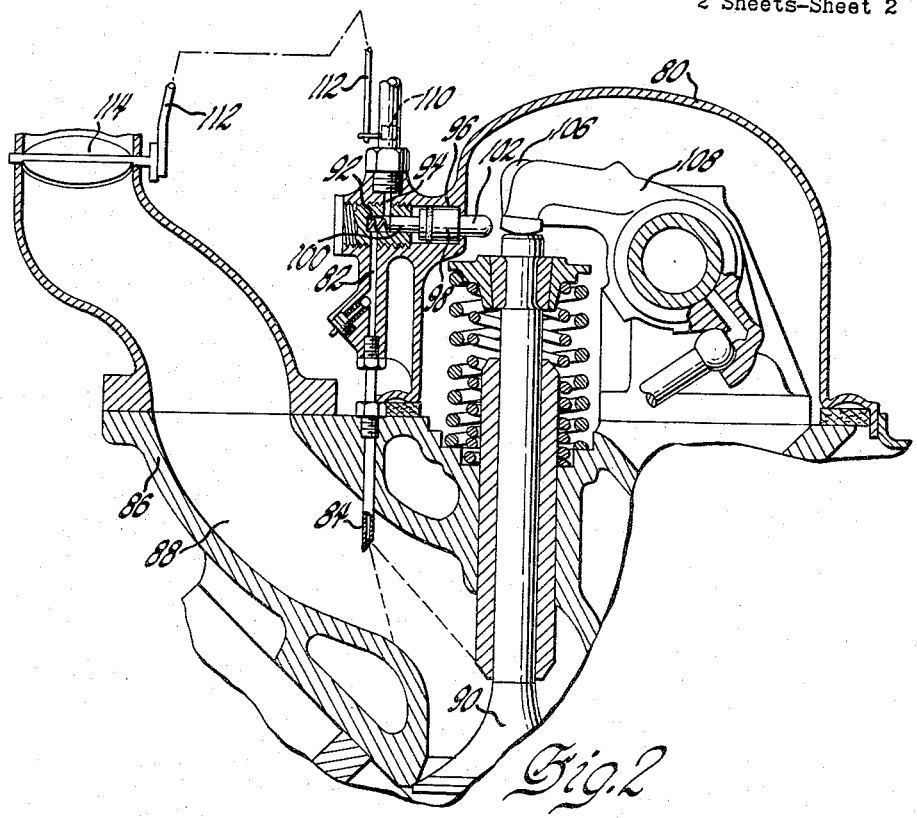
Figure 2 represents another modification of the present invention.
Figure 3:
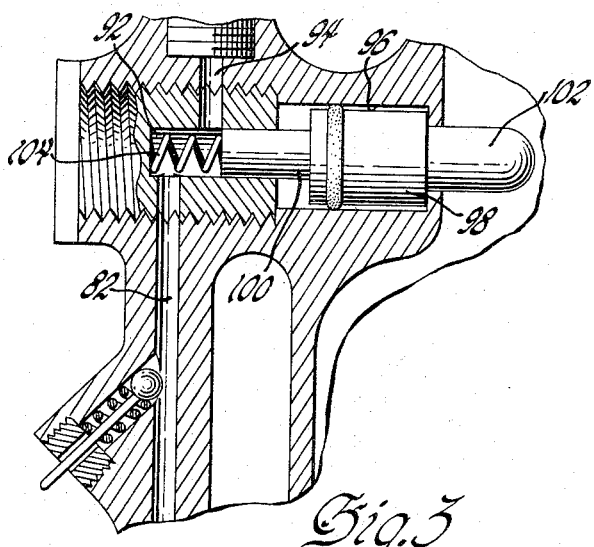
Figure 3 is a fragmentary enlargement of Figure 2.

In the modification of Figure 2 a cylinder head cover is shown at 80 and includes a fuel supply passage 82 formed therein which terminates in a nozzle tube 84 adapted to project through cylinder head 86 and terminate within induction passage 88 proximate intake valve 90. Fuel passage 80 communicates at its upper end with a passage or chamber 92 to which is also communicated an inlet passage 94 axially offset from passage 82. A bore 96 is formed in cover casing 80 in communication with chamber 92 and is adapted to slidably support a piston 98 having a stem portion 100 projecting within the chamber. Piston 98 includes another stem portion 102 projecting from the other end thereof and extending through an opening in the inner wall of cover 80. A spring 104 is disposed within chamber 92 and is adapted to bias against the stem 102 to move the piston 98 to the right as shown in Figure 2. In this position the fuel inlet passage is adapted to supply a metered quantity of fuel to the chamber 92.

A cam surface 106 is formed on rocker arm 108 and is adapted, during the inlet valve opening movement of said arm, to engage stem 102 of piston 98 to shift the piston to the left causing stem 100 to block the inlet passage 94 and pump a metered quantity of fuel through the fuel passage 82 to the nozzle 84. As with the modification of Figure 1, a spring biased ball check valve 108 is provided in casing 80 to prevent fuel from dribbling through the nozzle 84 but which check valve is adapted to be opened by fuel pressure during the pumping stroke of the piston 98.

In order to control the quantity of fuel metered to the induction passage during the cyclic operation of piston pump 98, a suitable valve means 110 is provided in the fuel inlet passage 94. The valve 110 is suitably connected through a link 112 to the throttle valve 114 and is so constructed that as the throttle opens the quantity of fuel flow through the valve is increased.

We claim:

1. A charge forming device for an internal combustion engine comprising air intake passage means for delivering air to a cylinder of the engine, a throttle valve for controlling the quantity of air flowing through said passage means, a fuel nozzle disposed in said intake passage means posteriorly of said throttle, an inlet valve disposed in said passage means proximate the cylinder and adapted to admit a fuel-air mixture into said cylinder, a rocker arm for periodically opening said inlet valve, a source of fuel, conduit means communicating said fuel source with said nozzle, means associated with said conduit means for pumping a metered quantity of fuel therethrough, said pumping means being actuated by said rocker arm, and throttle controlled means for varying the quantity of said metered charge in accordance with the position of said throttle, a valve disposed in said conduit means intermediate said nozzle and said pumping means, and means biasing said valve in a closed position, said valve being opened to permit fluid flow therepast by the pressure of the timed injection charge.

2. A charge forming device for an internal combustion engine comprising air intake passage means for delivering air to a cylinder of the engine, a throttle valve disposed in said intake passage means, a fuel nozzle projecting within said passage means posteriorly of the throttle, an intake valve disposed within said passage proximate the cylinder for periodically admitting a mixture of fuel and air into said cylinder, a rocker arm for periodically opening said inlet valve, a source of fuel, conduit means communicating said fuel source with said nozzle, at least a portion of said conduit means being formed of a flexible material, means controlled by said rocker arm for periodically decreasing the volume of the flexible portion of said conduit means for pumping a metered quantity of fuel through said nozzle, and throttle controlled means for varying the quantity of fuel pumped by said rocker arm controlled means.

3. A charge forming device for an internal combustion engine as set forth in claim 2 in which said rocker arm pumping means comprises a pivoted arm adapted to longitudinally engage the flexible portion of said conduit means, a cam surface formed on said pivoted lever adjacent said rocker arm, a cam formed on said rocker arm and adapted to engage said lever cam surface, said cam being adapted to move said lever into engagement with the flexible portion of said conduit means during the periodic movement of said rocker arm to open said inlet valve, the periodic engagement of said lever with said flexible conduit portion being adapted to decrease the volume of said conduit and thereby pump a metered quantity of fuel to said nozzle, said throttle controlled means being adapted to move said lever to vary the quantity of fuel pumped by said lever and rocker arm.

4. A charge forming device for an internal combustion engine as set forth in claim 3 in which said lever includes means for preventing the flow of fuel in the direction of said fuel source.

5. A charge forming device for an internal combustion engine comprising a cylinder head, an air intake passage formed in said head and communicating with a cylinder of said engine, a cover for said cylinder head, an air intake passage formed in said cover and communicating with said passage, a throttle valve disposed in the cover intake passage, a fuel nozzle projecting within the cylinder intake passage posteriorly of said throttle, an inlet valve slidably disposed within said cylinder head and adapted to control the flow of fuel-air mixture into an associated cylinder, a source of fuel, conduit means disposed in said cover and communicating said fuel source with said nozzle, pumping means disposed in said cover and coacting with said conduit means to pump a timed charge of fuel through said nozzle when said inlet valve is opened, a rocker arm for periodically opening said inlet valve, said rocker arm being adapted to actuate said pumping means, and throttle controlled means coacting with said pumping means for varying the quantity of said timed fuel charge.

6. A charge forming device for an internal combustion engine as set forth in claim 5 in which said pumping means comprises a piston slidably mounted in said cover and including a first stem portion projecting within said conduit means, a second stem portion formed on said piston and projecting toward said rocker arm, a cam surface formed on said rocker arm proximate said second stem portion and adapted to periodically engage said latter portion to cause said first stem portion to pump a timed fuel charge to said nozzle.

7. A charge forming device for an internal combustion engine comprising air intake passage means for delivering air to each cylinder of the engine, a throttle valve disposed in said intake passage means, a fuel nozzle for each cylinder projecting within said passage means posteriorly of the throttle, an intake valve disposed within said passage proximate each cylinder for periodically admitting a mixture of fuel and air into said cylinder, a rocker arm for periodically opening said inlet valve, a source of fuel, conduit means communicating said fuel source with said nozzle, at least a portion of said conduit means being formed of a flexible material, means controlled by said rocker arm for periodically decreasing the volume of the flexible portion of said conduit means for pumping a metered quantity of fuel through said nozzle, valve means coacting with said conduit means anteriorly of said pumping means for blocking fuel flow toward said fuel source, and throttle controlled means for varying the quantity of fuel pumped by said rocker arm controlled means.

8. A charge forming device for an internal combustion engine as set forth in claim 2 in which said rocker arm pumping means comprises a pivoted arm adapted to longitudinally engage the flexible portion of said conduit means, a cam surface formed on said pivotal lever adjacent said rocker arm, a cam formed on said rocker arm and adapted to engage said lever cam surface, said cam being adapted to move said lever into engagement with the flexible portion of said conduit means during the periodic movement of said rocker arm to open said inlet valve, the periodic engagement of said lever with said flexible conduit portion being adapted to decrease the volume of said conduit and thereby pump a metered quantity of fuel to said nozzle, said throttle controlled means being adapted to move said lever to vary the quantity of fuel pumped by said lever and rocker arm, and a valve means for preventing the reverse flow of fuel through said conduit means when fuel is being pumped to said nozzle.

9. A charge forming device as set forth in claim 8 in which said valve means comprises an enlarged portion formed on said pivoted lever and adapted to engage said flexible portion of the conduit means, and an adjustable stop disposed on the opposite side of said conduit means from said enlarged lever portion, said enlarged lever portion coacting with said stop to block the reverse flow of fuel during the pumping of fuel to said nozzle.

References Cited in the file of this patent

UNITED STATES PATENTS

| | | |
|---|---|---|
| 1,288,420 | Jay | Dec. 17, 1918 |
| 1,393,551 | Large | Oct. 11, 1921 |
| 1,753,021 | Riehm | Apr. 1, 1930 |
| 1,855,443 | Ericson | Apr. 26, 1932 |
| 2,306,733 | Joslyn | Dec. 29, 1942 |
| 2,383,749 | Showers | Aug. 28, 1945 |
| 2,758,577 | Malloy | Aug. 14, 1956 |

FOREIGN PATENTS

| | | |
|---|---|---|
| 50,520 | Sweden | Mar. 24, 1917 |
| 706,145 | Germany | May 19, 1941 |
| 662,172 | Great Britain | Dec. 5, 1951 |